B. BENDER.
HOSE NOZZLE.
APPLICATION FILED MAR. 17, 1920.

1,375,891.

Patented Apr. 26, 1921.

Inventor
Berlin Bender
By Percy H. Moore
Attorney.

UNITED STATES PATENT OFFICE.

BERLIN BENDER, OF WASHINGTON, DISTRICT OF COLUMBIA.

HOSE-NOZZLE.

1,375,891.  Specification of Letters Patent.  Patented Apr. 26, 1921.

Application filed March 17, 1920. Serial No. 366,535.

*To all whom it may concern:*

Be it known that I, BERLIN BENDER, a citizen of the United States of America, residing at Washington, District of Columbia, have invented certain new and useful Improvements in Hose-Nozzles, of which the following is a specification.

My invention relates to nozzles and more particularly to the type of nozzle employed in connection with garden hose.

When using garden hose as a lawn sprinkler it frequently happens that to avoid spraying pedestrians or passing vehicles it becomes necessary for the user to deflect or drop the nozzle, or call upon someone to turn off the water supply. The object of my invention is to obviate these difficulties by providing means whereby the passage of water through the nozzle may be conveniently shut off by the user merely closing a normally open valve in the nozzle.

In the accompanying drawing wherein a preferred embodiment of my invention is illustrated:

Referring more particularly to the drawings, 1 represents a hose nozzle comprising a threaded end 2 for connecting with the hose (not shown) and a threaded end 3 adapted to receive a discharge nozzle or sprayer 15.

Figure 2:
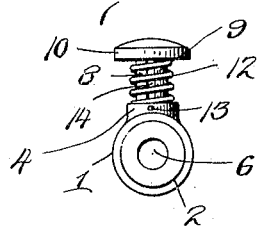
Fig. 2 is an end view of the same.
Figure 3:
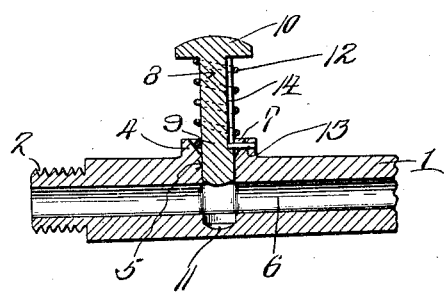
Fig. 3 is a view similar to Fig. 1 showing the valve in open position.
Figure 4:
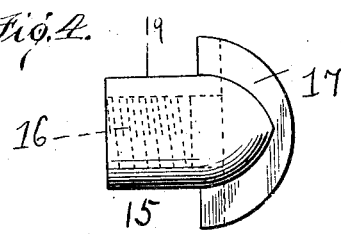
Fig. 4 is a side view of the discharge nozzle or sprayer.
Figure 5:
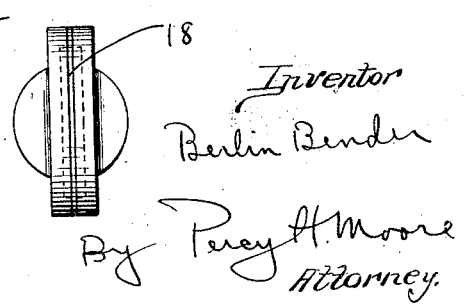
Fig. 5 is an end view of the sprayer.

The nozzle 1 is formed adjacent the inner end 2 thereof with an enlargement 4 having a preferably rectangular opening 5 communicating with the bore 6 of the nozzle. The upper or outer end of this opening is slightly enlarged, its wall being beveled to form a cup-shaped recess 7, for a purpose about to be described and slidably mounted in the opening 5 is a valve 8 comprising a stem 9 and a head 10, the lower end of the stem being substantially semi-circular in shape to seat within a corresponding shaped recess 11 formed interiorly of the nozzle in alinement with the opening 5. It will be understood that the stem 9 is of a size and shape to snugly fit within the opening 5 and recess 11 and that the bore 6 is of slightly smaller diameter than the cross sectional area of the stem 9. The valve 8 is normally maintained in open or dotted line position Fig. 2, and full line position Fig. 3 by means of a coil spring 12, bearing at its upper end against the head 10 of the valve and at its other end seating in the recess or depression 11.

Figure 1:
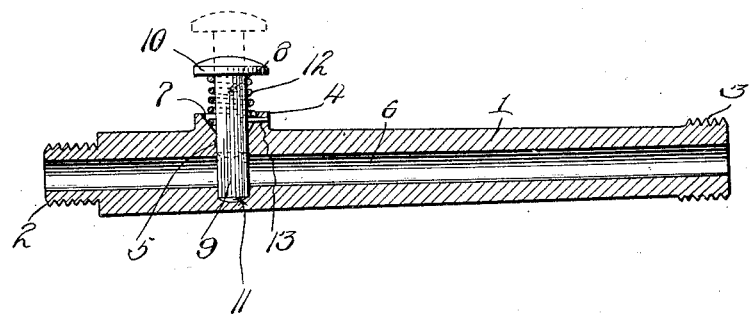
Figure 1 is a longitudinal sectional view of my invention.

As just stated the bore 6 of the nozzle is normally open or unobstructed by the valve stem 9, but when the user desires to check or shut off the flow of water therethrough, all that is necessary is to depress the valve to full line position, Fig. 1. A pin 13 passing through one wall of enlargement 4 engages at its inner end in a longitudinal groove 14 formed in the valve stem thus preventing rotary movement of the valve.

The discharge-nozzle or sprayer 15 is formed with a tubular portion 19 internally threaded as at 16 to receive the threaded end 3 of the nozzle 1. The opposite end of the discharge-nozzle is formed with a spraying head 17 having a restricted transverse slot 18 for an obvious purpose.

From the foregoing it will be seen that I have devised a simple and conveniently operable means for shutting off the discharge of water, which means does not interfere with the normal flow.

What I claim is:

A hose nozzle formed with a substantially central bore, one end of said nozzle being formed with means for attaching the same to a hose and at its other end being provided with means for attaching a discharge-nozzle thereto, an enlargement on said nozzle intermediate of said ends, said enlargement formed with an opening communicating with said bore and having a cup-shaped recess surrounding said opening, said nozzle formed with an interiorly located recess in alinement with said opening, a headed valve slidably mounted in said opening and adapted to pass across said bore and seat in said recess when the valve is depressed to closed position and a coil spring engaging said headed valve, at one end and seated in said recess at its other end normally maintaining said valve in open position leaving said bore unobstructed.

In testimony whereof I affix my signature.

BERLIN BENDER.